Sept. 5, 1961       M. M. STRIPLIN, JR., ET AL       2,999,010
MANUFACTURE OF SUPERPHOSPHORIC ACID
Filed March 25, 1957
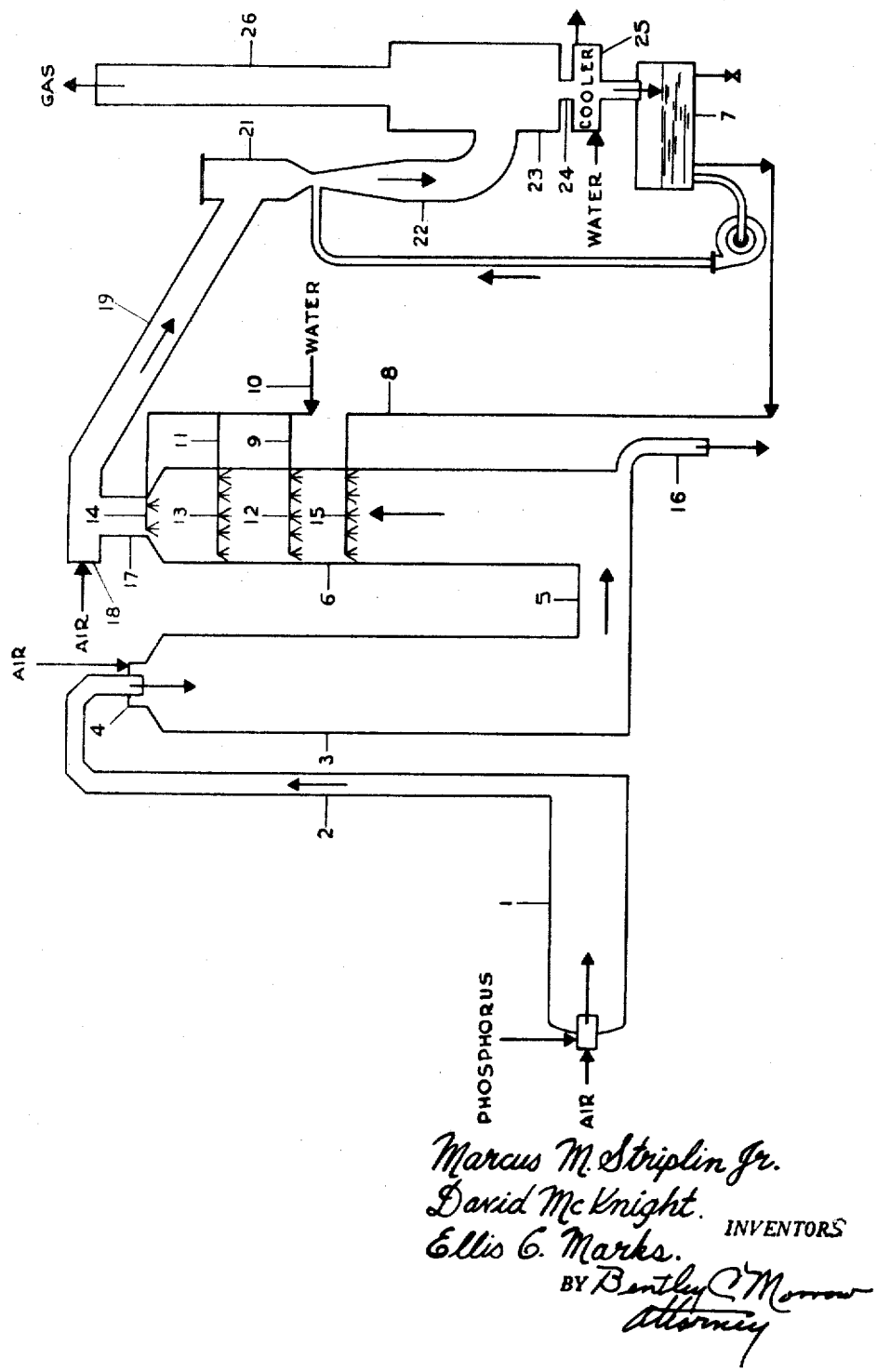

United States Patent Office 2,999,010
Patented Sept. 5, 1961

2,999,010
MANUFACTURE OF SUPERPHOSPHORIC ACID
Marcus M. Striplin, Jr., and David McKnight, Florence, and Ellis C. Marks, Sheffield, Ala., assignors to Tennessee Valley Authority, a corporation of the United States
Filed Mar. 25, 1957, Ser. No. 648,445
2 Claims. (Cl. 23—165)
(Granted under Title 35, U.S. Code (1952), sec. 266)

The invention herein described may be manufactured and used by or for the Government for governmental purposes without the payment to us of any royalty therefor.

This invention is an improved method for the production of phosphoric acid having a concentration between that of 100 percent $H_3PO_4$ (72.4 percent $P_2O_5$) and pyrophosphoric acid (79.8 percent $P_2O_5$). In this range of concentration the acid is a mixture of orthophosphoric acid with meta-, pyro-, and other polyphosphoric acids in proportions that vary with the concentration. This acid has a number of physical and chemical properties which make it a very desirable material for several purposes of increasing commercial importance. The term "superphosphoric acid" has been used to designate such acids and is used with this meaning in this specification and claims.

Four methods for preparing superphosphoric acid have been suggested. These are:

(1) Burning phosphorus with air containing a controlled amount of moisture sufficient to produce phosphoric acid of the desired concentration, followed by cooling and collecting the resulting acid by mechanical means, (2) Burning phosphorus with dried air, cooling and collecting the resulting dry, solid $P_2O_5$ and dissolving it in a quantity of water sufficient to form acid of the desired concentration, (3) Burning phosphorus with undried air, followed by further hydration of the phosphorus pentoxide produced and recovery of the resulting acid mist in a packed tower, such as is shown in U.S. Patent 2,303,318, and (4) Burning phosphorus with dried air and absorbing the resulting phosphorus pentoxide vapor in phosphoric acid of slightly lower concentration than that desired in the product, as is shown in U.S. Patent 2,247,373.

Difficulties and disadvantages have been present in each of these processes; however, since the present invention is an improvement in process (3) above, only those encountered in process (3) will be mentioned here.

A principal difficulty in operating according to process (3) above has arisen from the fact that recovery of the phosphorus pentoxide is very incomplete when the product is superphosphoric acid. The hydrated step must be carried out at a high temperature to prevent condensation of acid of lower concentration and, as a result, a large quantity of effluent gases issue from this step. These gases contain phosphoric acid and a disproportionate quantity of water. Since they issue at high temperature, they are very corrosive and destructive to auxiliary equipment. After some cooling, they can be condensed and recovered in a suitable packed tower, or preferably in a Venturi-type scrubber. The product of this condensation is a more dilute phosphoric acid which can be blended with the strong acid collected in the hydration step when an acid of intermediate strength is desired.

When superphosphoric acid is the product desired, the necessary production of a large quantity of dilute acid is a decided disadvantage. To overcome this disadvantage, it has been proposed to conduct the hydration step at still higher temperature by using a decreased proportion of water. The result has been increased temperature of effluent gases and increased corrosion problems with only a small decrease in the quantity of more dilute acid produced.

It is an object of this invention to provide a process for producing superphosphoric acid wherein temperatures attained in the hydration step are reduced and corrosion of the hydrator and auxiliary equipment is greatly reduced.

Another object is to provide such process wherein the quantity of dilute phosphoric acid produced is minimized.

Still another object is to provide such process wherein an increased rate of burning phosphorus can be maintained, together with a large increase in the quantity of superphosphoric acid produced.

Other objects and advantages of our invention will become apparent as this disclosure proceeds.

We have found that these objects are attained in a process which comprises burning phosphorus in air, passing the resulting hot phosphorus pentoxide into a hydration zone; spraying water into the hydration zone; syraying relatively cool dilute phosphoric acid from a latermentioned step into the hydration zone as a free-falling spray of droplets; collecting sufficient additional phosphoric acid in the falling droplets of phosphoric acid to convert them to superphosphoric acid; withdrawing super phosphoric acid from a lower part of the hydration zone; withdrawing a hot gaseous effluent from the hydration zone; condensing a more dilute phosphoric acid from the effluent; and returning the relatively cool, dilute phosphoric acid into the hydration zone as a spray.

We have found that the return of the cooled, more dilute phosphoric acid to the hydration zone in the form of a free-falling spray is very effective in reducing temperatures and increasing the proportion of superphosphoric acid formed. The cooling effect is due to direct heat exchange between the hot gases and the relatively cool droplets, and to evaporation of water from the droplets. As a result, the quantity of phosphorus burned can be increased 10 to 15 percent or so without raising the temperature in the hydration zone to that normally encountered in producing superphosphoric acid. The gaseous effluent from the hydration zone also is considerably cooler, and corrosion of auxiliary equipment is minimized.

We have found that the spray of dilute phosphoric acid is very effective in hydrating the phosphorus pentoxide to form phosphoric acids and is far more effective than water sprayed alone into the hydration zone in collecting the acids formed. We believe that the explanation is probably this: A majority of the drops of water sprayed into the hot gases passing through the hydration zone are completely evaporated to form steam. This steam hydrates phosphorus pentoxide to form phosphoric acids in vapor phase. While it is well known that droplets of phosphoric acids will condense under such conditions to form a fog or mist, these droplets are so small that a large proportion of them normally are swept out of the hydration zone by the effluent gases. When a spray of dilute phosphoric acid is used, the drops are not flashed to steam. Water is evaporated from each drop, but smaller drops will remain in liquid state. The evaporated water assists in the hydration of the phosphorus pentoxide present, and the resulting acids condense to form a fog or mist. The large number of residual droplets from the phosphoric acid spray falling through this fog mechanically scrub it out of the gases. Whether this theoretical explanation be correct or not, we have found that we consistently produce at least 3 times as much superphosphoric acid in the same equipment when hydration is accomplished in the presence of a spray of dilute phosphoric acid as is obtained by use of a water spray alone for hydration.

By increasing the rate at which phosphorus is burned, all the dilute phosphoric acid produced can be returned to the hydration zone as spray, thus producing superphosphoric acid as the sole product. Temperatures remain low, the proportion of superphosphoric acid produced is increased greatly, and corrosion is minimized.

The attached drawing diagrammatically illustrates an application of principles of our invention.

With reference thereto, phosphorus is vaporized in a vaporizer 1. Preferably, the heat required is obtained by admitting some air, insufficient in quantity to burn all the phosphorus completely. The resulting mixture of phosphorus and phosphorus pentoxide is passed via line 2 to a combustion chamber 3. Auxiliary air is admitted at 4 in quantity somewhat in excess of that required to burn all the phosphorus present to phosphorus pentoxide. As the burning phosphorus passes down combustion chamber 3, temperatures of 1000° F. or more usually develop. Combustion to phosphorus pentoxide is substantially complete near the bottom of this chamber. The resulting phosphorus pentoxide passes through a suitable duct 5 and upward through a hydration zone 6.

Water, from a source not shown, is fed via lines 10, 9, and 11 to suitable spraying devices 12, 13, and 14, and is sprayed into the hot gases rising in hydration zone 6. Relatively cool dilute phosphoric acid from surge tank 7 is fed via line 8 to a spraying device 15 and is introduced into the hydration zone in the form of a free-falling spray. The temperature of this dilute acid may be anywhere from the atmospheric temperature up to about 200° F. or so, depending on the extent of cooling necessary with the particular equipment used. The resulting droplets fall down countercurrent to rising hot gases containing phosphorus pentoxide. Because of the very large surface exposed to these gases, heat exchange and collection of a mixture of phosphoric acids are rapid. The gases are cooled rapidly, and the droplets are converted to superphosphoric acid.

Liquid superphosphoric acid accumulates in the bottom of hydration zone 6 and is drawn off, either continuously or at intervals, via line 16 to storage or use.

A gaseous effluent is withdrawn through neck 17 of the hydration zone. Air from the surrounding atmosphere is drawn in at port 18 and mingles with the gaseous effluent, thus cooling and diluting the effluent. This dilution with air is not essential, provided that a suitable means for recovery of phosphoric acid is provided. With a scrubber of the type illustrated, high velocity of gases is necessary for efficient recovery, and drawing in additional air both increases the volume of gases passing through the scrubber per minute and cools the effluent gases.

The resulting mixture is passed via line 19 to a suitable means for recovering phosphorus pentoxide as phosphoric acid, illustrated as a Venturi-type scrubber 21. This type apparatus is preferred because it is low in cost, is highly efficient, and does not corrode rapidly under the conditions encountered in our process when made of ordinary stainless steel.

Effluent from the scrubber 21 is led by line 22 to a separator 23. Condensed, relatively dilute phosphoric acid from separator 23 flows by line 24 and cooler 25 to surge tank 7. The cooler 25 may be inserted in line 24 if desired, thus reducing the temperature in surge tank 7 to that of the surrounding atmosphere. Often this is not necessary, but it is desirable with certain types of equipment when maximum cooling in the hydration zone is necessary or when the temperature of the superphosphoric acid produced is to be held as low as possible. Uncondensed gases, consisting essentially of nitrogen, oxygen, and water, usually at a temperature of about 200° F. or so, are withdrawn by line 26 to a stack or other waste-disposal means.

Example

Our process has been carried out as described above on full commercial scale. The apparatus used was arranged as is shown in the attached drawing. The following table shows the results obtained in one day of operation in the production of superphosphoric acid at a concentration in the range 73–77 percent $P_2O_5$ according to our invention, with recirculation of the dilute phosphoric acid from the Venturi-type scrubber, placed in contrast with results obtained by operating the same equipment for one day according to the prior art, i.e., by spraying water only into the hydration zone.

|  | Water only sprayed into hydration zone | Dilute phosphoric acid and water sprayed into hydration zone |
| --- | --- | --- |
| Rate of recirculation of scrubber acid, gallons per minute | 0 | 5.9 |
| Phosphorus burning rate, calculated, pounds per hour | 2,284 | 2,450 |
| Temperature, °F.: |  |  |
| Burner | 1,023 | 1,060 |
| Hydration zone outlet | 228 | 208 |
| Scrubber inlet | 210 | 170 |
| Acid from hydration zone | 580 | 540 |
| Superphosphoric acid from hydration zone: |  |  |
| Concentration, percent $H_3PO_4$ | 105.2 | 106.5 |
| Production rate, gallons per minute | 2.18 | 6.82 |
| Phosphorus content, pounds per hour | 690 | 2,170 |
| Scrubber acid: |  |  |
| Concentration, percent $H_3PO_4$ | 79.5 | 68.0 |
| Production rate, gallons per minute | 7.5 | ¹ 1.74 |
| Phosphorus content, pounds per hour | 1,590 | 280 |
| Acid from stack drain: |  |  |
| Concentration, percent $H_3PO_4$ | 6.5 | 2.5 |
| Production rate, gallon per minute | 0.38 | 0.50 |
| Phosphorus content, pounds per hour | 4 | 2 |

¹ Includes only scrubber acid overflowing to a sump; 5.9 gallons per minute recycled to hydration zone.

The rate of production of superphosphoric acid by the same equipment was more than 3 times as great when the more dilute phosphoric acid from the Venturi-type scrubber was recirculated and sprayed into the hydration zone than when water alone was used for hydration. Although the rate of burning phosphorus was increased, temperatures at the outlet from the hydration zone and at the scrubber inlet were reduced, thus reducing corrosion of auxiliary equipment. The quantity of phosphoric acid passing the hydration zone outlet was much smaller, resulting in collection of a more dilute acid by the scrubber.

It should be noted that not quite all the dilute acid collected by the Venturi-type scrubber was recirculated during the particular day the results reported above were obtained. All dilute acid produced can be recirculated, with still greater lowering of the temperature. If the temperature lowering is sufficient to prevent corrosion with any particular equipment when only a part of the dilute acid is recirculated, the rate of burning phosphorus can be increased when all dilute acid is recirculated without increasing the temperature from this desired degree. Steady-state operation is easily attained.

We claim as our invention:

1. An improved process for the production of superphosphoric acid which comprises the steps of burning phosphorus in air; passing the resulting hot vaporous phosphorus pentoxide mixture upward through a vertical hydration zone; introducing a relatively cool condensate of diluate phosphoric acid from a later-mentioned step into said hydration zone as a spray of free-falling droplets; introducing a spray of water into said hydration zone at positions therein spaced vertically above the position of said acid introduction; adjusting the relative proportions of said acid and said water introduced so as to maintain a concentration of about 72% to 79% $P_2O_5$ in collected droplets of the resulting superphosphoric acid; withdrawing said superphosphoric acid from a lower part of said hydration zone; withdrawing a hot, gaseous effluent from said hydration zone at an upper part thereof; condensing a more dilute phosphoric acid from said effluent; and returning the resulting relatively cool, dilute phosphoric acid to said hydration zone as a spray.

2. The superphosphoric acid product produced by the steps comprising burning phosphorus in air; passing the resulting hot vaporous phosphorus pentoxide mixture upward through a vertical hydration zone; introducing a relatively cool condensate of dilute phosphoric acid from a later-mentioned step into said hydration zone as a spray of free-falling droplets; introducing a spray of water into said hydration zone at positions therein spaced vertically above the position of said acid introduction; adjusting the relative proportions of said acid and said water introduced so as to maintain a concentration of about 72% to 79% $P_2O_5$ in collected droplets of the resulting superphosphoric acid; withdrawing said superphosphoric acid from a lower part of said hydration zone; withdrawing a hot, gaseous effluent from said hydration zone at an upper part thereof; condensing a more dilute phosphoric acid from said effluent; and returning the resulting relatively cool dilute phosphoric acid to said hydration zone as a spray.

References Cited in the file of this patent

UNITED STATES PATENTS

| | | |
|---|---|---|
| 2,247,373 | Hartford et al. | July 1, 1941 |
| 2,303,318 | Baskervill | Dec. 1, 1942 |
| 2,611,681 | Bellinger | Sept. 23, 1952 |

UNITED STATES PATENT OFFICE
CERTIFICATE OF CORRECTION

Patent No. 2,999,010                                          September 5, 1961

Marcus M. Striplin, Jr., et al.

It is hereby certified that error appears in the above numbered patent requiring correction and that the said Letters Patent should read as corrected below.

Column 1, line 52, for "hydrated" read -- hydration --; column 4, line 67, for "diluate" read -- dilute --.

Signed and sealed this 6th day of February 1962.

(SEAL)
Attest:

ERNEST W. SWIDER
Attesting Officer

DAVID L. LADD
Commissioner of Patents